Nov. 9, 1954          T. A. O. GROSS          2,694,149
                   ELECTRONIC REGULATOR SYSTEM
Filed June 29, 1950                        2 Sheets-Sheet 1

INVENTOR
THOMAS A. O. GROSS
BY Elmer J. Gorn
ATTORNEY

Nov. 9, 1954       T. A. O. GROSS            2,694,149
              ELECTRONIC REGULATOR SYSTEM
Filed June 29, 1950                      2 Sheets-Sheet 2
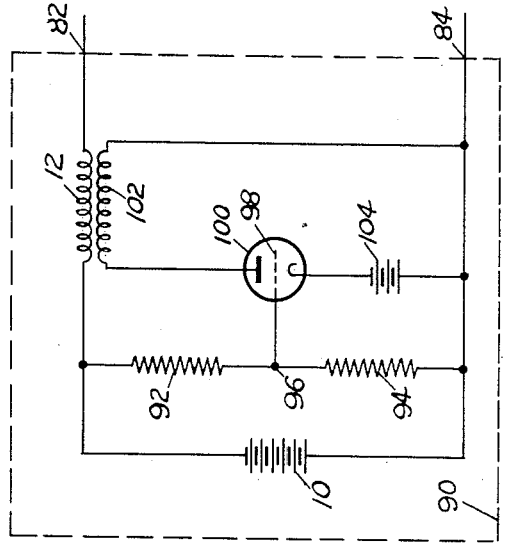
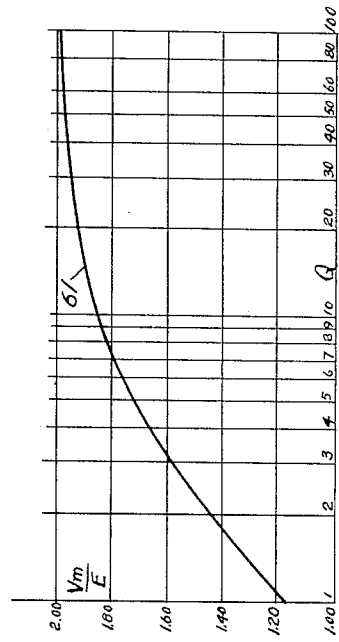
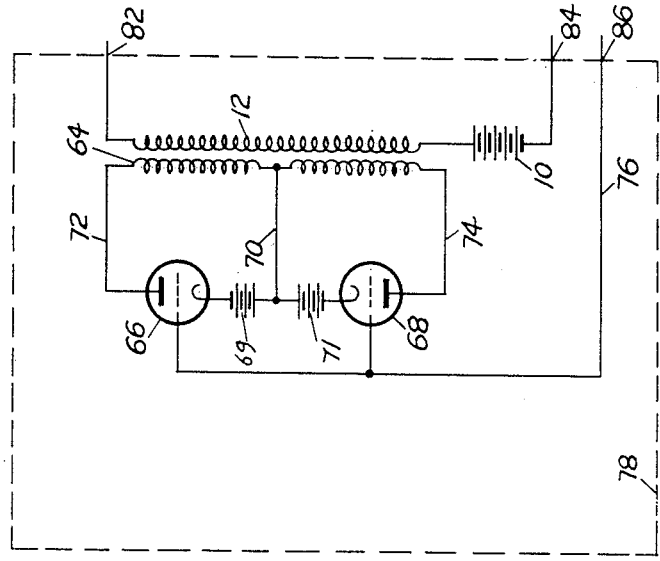
*INVENTOR*
*THOMAS A. O. GROSS*
BY  *Elmer J. Gorn*
            *ATTORNEY*

United States Patent Office 2,694,149
Patented Nov. 9, 1954

2,694,149

ELECTRONIC REGULATOR SYSTEM

Thomas A. O. Gross, South Lincoln, Mass., assignor to Raytheon Manufacturing Company, Newton, Mass., a corporation of Delaware Application June 29, 1950, Serial No. 171,213

3 Claims. (Cl. 250—36)

This invention relates to the automatic control of the charge stored in an electrical storage element.

In charging electrical storage condensers it often becomes desirable to automatically control within close limits the amount of charge stored. This is particularly desirable under high voltage high power requirement conditions where a storage condenser network is discharged at a fixed repetitive rate and the nature of the use made of this stored energy requires close order constancy in the quantity of the charge stored. For example, one such case is found in line type pulse generators or modulators for pulsing the magnetron in radar system transmitters. In conventional modulators of this type, the charge stored in the pulse forming network is greatly affected by line voltage. Since the transmitter power developed is a function of the charge in the pulse forming network, it also is highly affected by line voltage. It may be shown that conventional pulse generators for radar system transmitters develop power output proportional to at least a squared, and usually a higher order function of the line voltage. This great sensitivity of transmitter power to line voltage variation has been, in the past, a principal reason for the use of elaborate means involving electronic regulator circuits for the control of line voltage. While such stabilization of the line voltage has helped in stabilizing the operation of the transmitter, it does not compensate for effects due to variations in the transmitter and modulator characteristics occurring during operation. Because of the high voltages and high power levels at these voltages encountered in the modulator circuit, direct electronic control of the charge in the pulse forming network has heretofore been precluded.

Pursuant to the present invention, electronic control of the charge in the pulse forming network is provided at a convenient voltage level and at a saving in size, weight, cost and complexity over line voltage regulators heretofore used. This is achieved generally by varying the Q of the isolation or charging impedance of the modulator in a manner to control the rate of charge to the storage network. Such control is obtained by coupling an electron current valve, such as triode, by transformer action to the isolation or charging impedance of the modulator so as to appear effectively as a variable resistance in series with the charging impedance. The transformer permits the triode to function with the control signal at ground and the use of plate voltages independent of the line voltage of the modulator. Thus any kind of current valve may be used provided it has appropriate plate dissipation. In a preferred embodiment of the invention, the control grid of the triode is connected through a suitable amplifier and peak reading voltage rectifier circuit to a biasing resistance at the magnetron. The operation of the triode is thereby controlled by the operating voltage of the magnetron in a manner to control the Q of the isolation or charging impedance so as to correct the charge on the storage system in a manner to produce a desired operating voltage at the magnetron.

A second embodiment of the invention utilizes two current valves connected back to back so as to provide full-wave control of the charging impedance.

In a third embodiment of the invention, the charge in the storage system is controlled from the line voltage wherein variations in line voltage are automatically compensated for.

These and other features, objects and advantages will become more apparent from the following description taken in connection with the accompanying drawings, wherein:

Fig. 2 is a schematic view which, taken in connection with a portion of Fig. 1, provides a second embodiment of the invention;

Fig. 3 is a schematic view which, taken in connection with a portion of Fig. 1, provides a third embodiment of the invention; and Fig. 4 is a graph illustrating the effect of the Q of the charging impedance on the ratio of charge voltage to line voltage.

Figure 1:
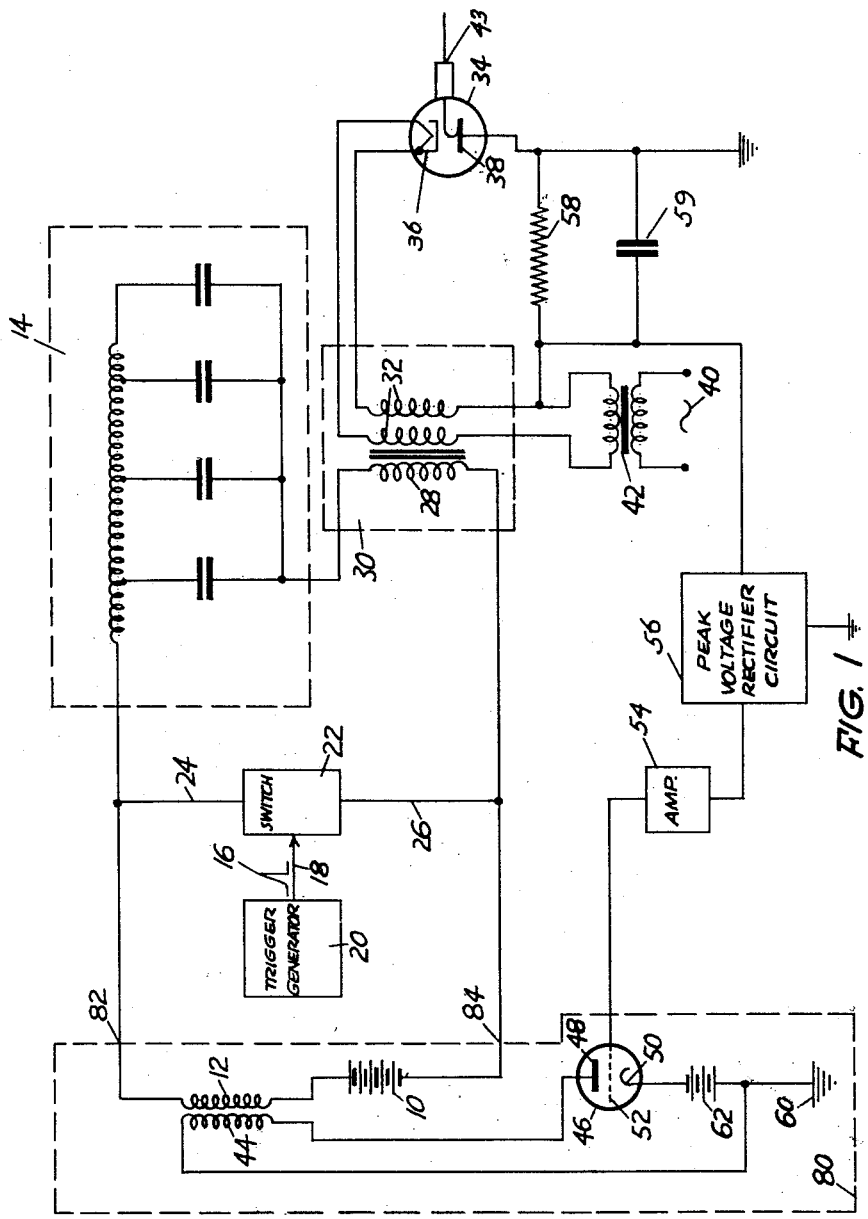
Fig. 1 is a partially schematic and partially block diagram of a preferred embodiment of the invention.

Referring to Fig. 1 in more detail, line voltage is provided from a suitable power source 10, such as a battery or rectified alternating current source. Current from the power source 10 passes through an isolation or charging impedance 12, such as an inductance coil, and produces a stored charge on the condenser storage system 14, which may be a conventional pulse forming network used in radar modulators. Each time a pulse 16 appears through line 18 from a trigger generator 20 at switch 22, such as a thyratron or conventional spark gap switch, the lines 24 and 26 are closed. The circuit composed of the line 26, switch 22, line 24, electrical storage system 14, and primary 28 of a pulse transformer 30 is thereby closed and the storage system 14 is caused to be discharged. Because of primary 28 and secondaries 32 of the pulse transformer 30, the discharge of the storage system causes a power pulse to appear across a suitable load, such as a magnetron 34 having a cathode 36 and anode 38 connected across the pulse transformer secondaries 32. The cathode 36 is heated from a suitable alternating current power source 40 by a transformer arrangement 42 connected to the secondaries 32 as shown. The power pulse is converted in the magnetron 34 to high frequency energy which appears in the magnetron output line 43 and which may be radiated into space by a suitable radiating system (not shown). When switch 22 is closed at the occurrence of pulse 16, the isolation or charging impedance 12 prevents the power source 10 from excessive discharge through lines 24 and 26. Charging impedance 12 also controls the rate at which the storage system 14 is charged between power pulses. A further control of this charging rate is provided by the addition of a circuit for varying the Q of the charging impedance 12. This is provided by an inductance coil 44 being inductively coupled to the inductance coil 12 and a suitably controlled current valve 46, such as a triode, with its anode 48 and cathode 50 connected across the inductance coil 44. Suitable control of the triode 46 is provided by connecting grid 52 of the triode 36 through amplifier 54 and peak voltage rectifier circuit 56 across a biasing resistance 58 and smoothing capacitance 59 between the anode 38 and transformer secondary 32 of the thyratron 34. The peak voltage across resistance 58 which is proportional to the current flow in the magnetron 34 is amplified by amplifier 54 to a suitable operating level and appears at control grid 52 of triode 46. Cathode 50 is maintained at a suitable reference level above ground 60 by power source, such as a battery 62.

As current begins to flow at an increasing rate through the charging inductance 12 to restore the charge on the energy storing network 14, the potential induced across the inductance 44 causes anode 48 of triode 46 to go negative with respect to ground 60. As the charging current rate through the charging inductance 12 diminishes, the potential at anode 48 is reversed and becomes positive with respect to the ground 60. Thus during this charging cycle, it is seen that the potential across triode 46 appears first as a negative voltage half cycle and then as a positive voltage half cycle with the point of charge from the negative to positive half cycle determined by the magnitude of the reference potential from power source 62. During the negative voltage half cycle, when anode 48 is negative with respect to cathode 50, triode 46 is nonconductive and therefore does not control charging current flow during this portion of the cycle. It is during the positive potential half cycle when anode 48 is positive with respect to cathode 50 that triode 46 may be made conductive by an amount determined largely by the potential at grid 52. It is during this half cycle that the charging of the storage network 14 is controlled. For general operation, it is found that sufficient control for proper operation of the radar modulator is achieved during this half cycle. In addition, another desirable feature is achieved by controlling the charge only during this latter half cycle. At the beginning of the charging current flow through impedance 12 to restore the charge on the storage network 14, the rate of current increase is relatively slow and the voltage rise approximates the swing of a cosine wave function. During this period of low current flow, a thyratron switch 22 has ample time to de-ionize and insure an open switch between lines 24 and 26 during the charging interval between power pulses which is particularly desirable where high repetition rates are used.

The embodiment shown in Fig. 1 is adapted for rapid corrective adjustment of the charge on the energy storage network 14 for proper operation of magnetron 34. By adjusting the time constant in the peak voltage rectifier circuit 56, corrective adjustment of the charge on the energy storage network 14 may be obtained in the interval immediately following a power pulse.

The corrective adjustment possible of the charge on the storage network 14, due to varying the Q of the charging impedance 12 in this manner, is shown by curve 61 in Fig. 4 where $V_m$ is the voltage to which the storage network 14 is charged and E is the line voltage.

Where closer charging control is desired and the de-ionizing time of switch 22 is not important, as where a spark gap switch 22 is used, a second embodiment is provided with control over both of the above-mentioned voltage half cycles. In this embodiment a center tapped inductive coil 64 (Fig. 2) is coupled to the charging inductance 12. Two current valves 66 and 68, such as triodes, are connected back to back with their cathodes connected to the center tap line 70 through reference voltage sources 69 and 71, and their anodes connected to the extremities 72 and 74, respectively, of the inductance coil 64. The grids of both triodes 66 and 68 are connected to a common line 76. This arrangement enclosed within the broken lines 78 in Fig. 2 is made to replace that portion in Fig. 1 enclosed in the broken lines 80 in Fig. 1. Connection to the remainder of the circuit in Fig. 1 is at points 82, 84 and 86. In this manner, triodes 66 and 68 will be conductive during each voltage half cycle mentioned above. The extent of the conduction will be determined by the operating voltage across resistance 58 at magnetron 34.

In a third embodiment compensation for variations in line voltage is achieved. In this embodiment, the portion of the circuit enclosed by broken lines 80 in Fig. 1 is replaced by the circuit enclosed in broken lines 90 in Fig. 3 and amplifier 54, peak voltage rectifier 56, resistance 58 and capacitance 59 may be removed. In this embodiment, voltage divider resistances 92 and 94 are arranged across the potential source 10. Variations in line voltage will appear at point 96 between the voltage divider resistances 92 and 94 and thereby at control grid 98 of triode 100. This voltage at grid 98 will cause current to flow in triode 100 during positive half voltage cycles induced in the inductance 102 from the charging impedance 12. A proper reference potential is provided, as by battery 104, for controlling the extent of the corrective influence of triode 100. The circuit enclosed in the broken lines 90 is connected to the rest of the circuit in Fig. 1 at points 82 and 84.

This invention is not limited to the particular details of construction and processes described, as many equivalents will suggest themselves to those skilled in the art. It is accordingly desired that the appended claims be given a broad interpretation commensurate with the scope of the invention within the art.

What is claimed is:

1. In a radar system a magnetron; means for pulsing said magnetron, said pulsing means comprising capacitive means for storing electrical energy, means for charging said capacitive means, means for periodically discharging said capacitive means into said magnetron, said charging means including a source of direct potential, inductive means in series with said potential source, variable resistive means effectively in series with said inductive means, and means responsive to the voltage across said magnetron for correctively varying the resistance of said variable resistive means.

2. In a radar system high frequency energy producing means, means for pulsing said high frequency energy producing means, said pulsing means comprising capacitive means for storing electrical energy, means for charging said capacitive means, means for periodically discharging said capacitive means into said high frequency energy producing means, said charging means including a source of direct potential, inductive means in series with said potential source, variable resistive means effectively in series with said inductive means, and means responsive to the voltage across said high frequency energy producing means for correctively varying the resistance of said variable resistive means.

3. In a radar system high frequency energy producing means, means for pulsing said high frequency energy producing means, said pulsing means comprising capacitive means for storing electrical energy, means for charging said capacitive means, means for periodically discharging said capacitive means into said high frequency energy producing means, said charging means including a source of direct potential, inductive means in series with said potential source, electron valve means inductively coupled to said inductive means, and means responsive to the voltage across said high frequency energy producing means for controlling said electron valve thereby controlling the charge in said electric energy storage means.

References Cited in the file of this patent

UNITED STATES PATENTS

| Number | Name | Date |
| --- | --- | --- |
| 2,262,044 | Philpott | Nov. 11, 1941 |
| 2,405,069 | Tonks | July 30, 1946 |
| 2,431,952 | Maxswell | Dec. 2, 1947 |
| 2,436,794 | Dawson | Mar. 2, 1948 |
| 2,462,918 | Stiefel | Mar. 1, 1949 |
| 2,469,977 | Morrison | May 10, 1949 |
| 2,477,946 | Smith | Aug. 2, 1949 |
| 2,534,261 | Gorham et al. | Dec. 19, 1950 |